Feb. 23, 1926.  
F. K. FISH, JR  
1,574,614  
PROCESS FOR RECOVERING BY-PRODUCTS FROM PLANT SUBSTANCES AND THE LIKE  
Filed Jan. 2, 1920
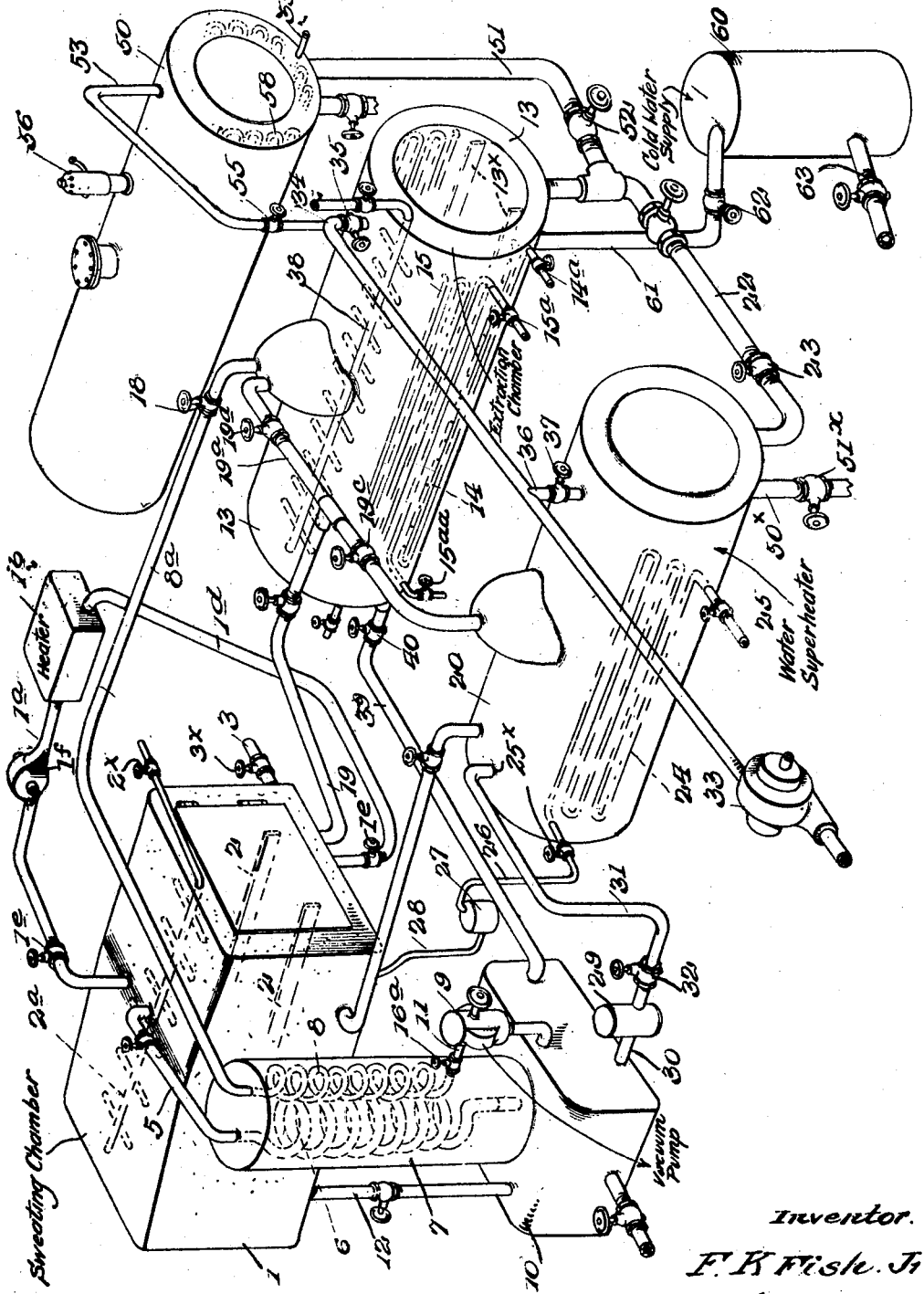
Inventor.  
F. K. Fish. Jr.  
by his Atty.

Patented Feb. 23, 1926.

1,574,614

UNITED STATES PATENT OFFICE.

FREDERICK K. FISH, JR., OF NEW YORK, N. Y.

PROCESS FOR RECOVERING BY-PRODUCTS FROM PLANT SUBSTANCES AND THE LIKE.

Application filed January 2, 1920. Serial No. 348,725.

*To all whom it may concern:*

Be it known that FREDERICK K. FISH, Jr., a citizen of the United States of America, residing at New York, in the county of New York and State of New York, has invented certain new and useful Improvements in a Process for Recovering By-Products from Plant Substances and the like, of which the following is a specification.

This invention relates to improvements in a process for recovering by-products from plant substances and the like, such for instance as terpenes, turpentines, resins, gums, acids, alcohols, resinous matter, and other extractives and the like.

Primarily the invention aims to utilize the terpenes, oils, acids, volatile components and other solvents combined with steam or superheated water; at or about atmospheric pressure, or under higher pressure and to subsequently treat the substance, such, for example, as resinous bearing woods, in superheated water holding such extractors at a temperature above its normal boiling point, alternated with a vacuum, all of which will economically and quickly collect in one concentrated solution the various by-products of the substance, the solution thereafter being distilled or otherwise treated to separate the different by-products one from the other, and from the water in which the wood is treated.

In carrying out the invention as applied to plant substance as wood or woody fibre I make use of the fact that turpentines, oils and acids of wood are effective solvents of the resins, gums or the like, or substances in the wood, and that all components of the oils of the wood, both those lighter than water and those heavier than water are substantially soluble in one another, I also make use of the fact that a vacuum lowers the boiling point of the constituents of the wood, and employ this expedient in assisting in the accomplishment of the desired result.

One way of carrying out my improved process is shown in the accompanying drawing, which represents a diagrammatic perspective view of an extraction plant, in which wood or other plant substance is treated to recover the by-products.

1 indicates a sweat-chamber, provided with a door or doors, an interior track 2, and spray pipe $2^a$ controlled by a valve $2^x$. This chamber may be supplied with steam or superheated steam through a pipe 3 controlled by a valve $3^x$, leading to a suitable source, or heat, such as steam or hot air and vapor may be introduced to the chamber through a pipe 19, leading to a container hereinafter referred to, and if desired heat such as steam or hot air may be introduced to the chamber through coils, not shown.

Communicating with the top of the sweat chamber is a pipe $1^a$ which leads into an air tight hot box $1^b$ suitably heated by coils (not shown). Communicating with the opposite end of the hot box is a pipe $1^d$, which leads into the bottom of the sweat box, a valve or valves $1^e$ being provided to control the pipes. In the pipe $1^a$ is a fan $1^f$, to draw the vapors from the top of the sweat chamber, and pass them through the hot box and through the pipe $1^d$, and into the bottom of the sweat chamber. The fan creates a suction through the sweat chamber, and quickly draws off the vapors and the latter are superheated in the hot box, and employed to act on the wood in the sweating step. The vapors are of course charged with the terpenes, oils, gums, and the like, which when superheated act to further the extraction of like constituents in the wood.

From the top or dome of the sweat-chamber extends a pipe 5, connected with coil 6 in a condenser 7, the coil extending into a collector tank 10.

A vacuum pump 9, connects at its suction end through pipe 11 to a second coil 8 of condenser 7, discharging into collector tank 10. Coil 8 is connected at its upper end to a pipe $8^a$ which leads to a container 13. 12 is a valved pipe which connects the bottom of the sweat-chamber 1 and the collector tank 10, to carry off the condensate from the chamber to the tank. The condenser 7 may be cooled by any well known cooling agent, as water or brine, which is circulated from a bottom inlet to an upper outlet, and is of the usual construction.

Located adjacent to and spaced from the sweat chamber 1, is a container 13, in which is a perforated coil 14, provided with a valve $14^a$, to supply steam to the interior of the container, and in the latter also are steam heating coils 15, having valves $15^a$, $15^{aa}$. The container is also provided with a door or doors, and in the container there is a track 13× preferably in line with the track 2, in the sweat chamber 1, and between the container 13 and the sweat chamber there will be a track for conveniently transferring a car carrying a load of wood or material from the sweat chamber 1 to the container 13 to be further treated. The pipe 8ª connects with the top of the container, and in it is a safety-valve 18, which also may act as an ordinary controlling valve. The pipe 19, leading from the lower portion of the sweat-chamber 1, is connected to a pipe 19ª, the ends of which are conected to the top of a tank 20, and the container 13, the pipe 19ª having controlling valves 19ᶜ and 19ᵈ for a purpose to be explained.

In the tank 20, are heating coils 24, having valve 25, and condensation pipe 26, having a valve 25× connected with a steam trap 27, which preferably discharges through pipe 28, into sweat-chamber 1.

The suction end of a force-pump 29, is connected with the collection tank 10, by pipe 30, and the discharge end of said pump is connected to the tank 20, by a pipe 31, having valve 32.

An air compressor 33, is connected with container 13, by pipe 34, provided with a valve 35, and said pipe is connected with tank 20, by a branch pipe 36, provided with a valve 37. Spray pipe 38, connected with a supply of cold water is installed at the top of container 13, a pipe 39 provided with a valve 40, connects the container 13, with the collector tank 10.

To effect the complete removal of the more insoluble and heavier gums, resinous, or tar like constituents in some wood, a chemical solution may be employed. This solution is retained in a tank 50, and may be alkaline, or acid or contain special ingredients which will act as an agent to dissolve and remove the resinous and like matter in and from the wood. The tank 50 may be connected to the container 13, by a pipe 51, having a valve 52. A branch pipe 53, connects the top of tank 50, with the compressed air line pipe 34, a valve 55 being employed to control the air passing through the pipe and in the top of the tank is a safety valve 56.

In the tank 50, are heating coils 58, and steam coils 59.

In connection with this step it is highly desirable that the wood be washed to recover any solution or resinous matter remaining in the wood, after the chemical solution is withdrawn. Therefore I provide a reservoir 60, containing cold water, and connected to container 13, by a pipe 61, having a valve 62. To the reservoir is connected a pipe 63 leading to a pressure apparatus (not shown) by means of which the water is forced into the container, and this wash water may be treated in my way to recover any contained constituents.

The foregoing description of the conventionally illustrated apparatus is simply for the purpose of outlining a plant for carrying out the process, and I will now described in detail the various steps in the process and the functions accomplished thereby.

Water is introduced into tank 20 through pipe 50× by opening valve 51× and if the plant has been previously used, the contents of collector-tank 10, are pumped into tank 20, and through the medium of heating coils 24, the liquid is super-heated or in other words the temperature of the liquid is raised above its boiling point, and the pressure is consequently raised above atmosphere, to prepare it for quickly acting on the wood later on when introduced into container 13.

Wood in any suitable form is loaded on a truck and run into the sweat-chamber 1, and live steam, super-heated steam, heated air or any combination of them are introduced through the pipe 3, and after the first truck load has passed through the sweat-chamber, and is under treatment in container 13, the steam from the container 13, is also utilized, as this is heavily charged with the turpentines removed from the wood while being in the container.

Valves in the pipes 19 and 19ª are regulated to allow the passage of steam as desired from either or both the container 13 and tank 20, into the sweat-chamber, and if necessary the heat in the sweat-chamber may be augmented by heat from suitable coils (not shown).

It is desirable that the temperature of the wood in the sweat-chamber be raised above the joint boiling point of turpentines and admixed liquid, usually water, and that the treatment of the wood during this step of the process be for one or two hours, depending upon the thickness and character of the wood or material being treated.

The steam, and terpene or like vapors in the sweat-chamber, penetrate and soften the entire structure of the wood, as well as the soluble gums and resins. At this temperature, the combination of steam and vapors reach even to the interior of the separate pieces and dissolve certain constituents which are insoluble in water. The wood is thus prepared for a more ready and effective treatment in the container 13. The high heat reached in the sweat-chamber causes the constituents which have been softened to move to a certain extent, to the surface of the wood, where they accumulate, producing in effect "sweat". This surface-wise movement may be increased by the occasional application of cold water through spray pipe 2ª, the sudden cooling of the surface of the wood or other material causing a partial condensation of the vapors with a lessened pressure which causes a movement of the interior vapors, liquids contained therein, surfacewise.

The sweat-chamber being tightly closed some slight pressure therein will be created, and to relieve this pressure the vapors which have not been previously condensed pass through pipe 5, and are condensed in the coil 6, and thereupon pass into collector-tank 10 and may thereafter be pumped into the tank 20, to be used with the water in subsequent treatment of the wood. A portion of the vapors are condensed in the sweat-chamber 1, and pass through the pipe 12 to the collector receptacle 10, for re-use in the process.

The condensate accumulated in the collector tank 10 will be pumped from time to time into tank 20 to add to the strength of the solvent liquor, and when the content of the tank 20 becomes as concentrated as may be desired, it is drawn off and is separated.

In some instances it is preferable to superheat the vapors rising from the wood in the sweat-chamber, and in their super-heated state direct them up through the chamber to act on the wood in conjunction with the moist heated vapors previously mentioned. Therefore, the valve 1$^e$ is opened and the fan 1$^f$ sucks the liberated vapors from the top of the sweat-chamber, and introduces vapors into the sealed hot box 16, where they become heated, and are subsequently directed through the pipe 1$^d$. The result of this action is to create a suction through the sweat-chamber, which causes the vapors charged with the terpenes, oils, and other volatile substances introduced through pipe 1$^d$ to co-operate with the steam and the vapors liberated from the wood, to co-mingle or mix and act promptly to dissolve and liberate other similar constitutents in the wood. In other words the charged vapor is, by this action employed as a solvent to act on the constituents in the wood containing the by-products to be recovered. While this action is going on a portion of the excess vapors are escaping through the pipe 5, to the collector tank, and the condensate at the bottom of the chamber likewise passes to said tank.

After the wood has been treated in the sweat-chamber for a sufficient time to raise the temperature to the required degree and to preliminarily soften it, dissolve and remove a portion of the different constituents sought to be recovered by this step, the steam supply through pipe 3 is cut off, or if the vapors from the container 13 are utilized, valve or valves 19$^c$ or 19$^d$ or both are closed, and the load of wood or treated material is removed and introduced into the container 13, and a new load is run into the sweat-chamber.

When the load of wood is removed from the sweat chamber, and is exposed to the air, while in transit to the container, the difference between the internal pressure of the wood and that of the exterior causes condensation and an interior movement surfacewise, this action preparing the wood for treatment in the next step in the container 13.

After admission of the wood, the container 13 is sealed, and valves 16$^a$ and 18 are opened, and the vacuum or suction pump 9 is started to create a vacuum of approximately 15 inches of water in the container. To quickly attain the vacuum, cold water is forced through spray pipe 38 and onto the wood. The vacuum removes terpenes and like vapors from the wood, which in passing through coil 8 condenses and is discharged into the collector-tank 10, for re-use in the process. The vacuum in the container lowers the pressure within the wood below atmospheric causing a cellular expansion which with the removal of the vapors from the wood tends to allow a more ready penetration of the steam employed in the next step in the process. Valve 18 is closed, and valve 14$^a$ is opened and live steam is admitted into the container 13, through perforated pipe 14 to create a pressure in the container of about 15 lbs., above atmospheric, and a corresponding temperature of approximately 250 degrees F., which destroys the vacuum, and raises the temperature and pressure in the wood. This steaming step is prolonged for a period of 20 minutes, more or less. This step vaporizes a portion of the oils and some of the remaining terpenes, and prepares the soluble ingredients for more effective action of the super-heated liquid employed in one of the succeeding steps in the process. In addition, steam under pressure, mixed with the vapors of the terpenes following the vacuum will more effectively act upon the interior of the wood thus accomplishing results that could not be attained in the sweat chamber. In addition to the steam, heat is maintained by means of the heating coils 15. At the conclusion of this step the steam pressure within the container is lowered, valve 18 is again opened, and the vacuum pump 9 is started to create in the container a second vacuum of about 20 inches. This sudden change of pressure around the wood causes the pressure within the wood to force the melted materials in the wood towards the surface and as the second vacuum is quickly created, thus lowering the boiling point of the materials in the wood, the temperature of which has previously been raised to 250° F., the high heat and the lowering pressure causes the terpenes and other substances to readily vaporize and pass out of the wood.

In drawing the second mentioned vacuum, the vapors which have not been condensed by the spray, pass through pipe 8ª, coil 8, pipe 11, and the vacuum pump 9, the condensate being discharged into collector tank 10 for reuse. This vacuum is prolonged for a period of approximately twenty minutes, then the valve 18 is closed. This vacuum, besides accomplishing the results just stated causes a cellular or fibrous expansion or adjustment and allows of a quicker and more effective penetration into the wood of the superehated liquid, which is next introduced into the container from tank 20.

The condensate from collector tank 10, is pumped into the tank 20, and mixes with the water therein, and the condensed terpenes and vapors become mixed with the superheated liquid and add to its solvent power. The valve 23, is opened and the superheated liquid passes from the tank 20, to the container 13. The movement of the liquid from the tank 20 to the container is assisted by opening the valve 37, and starting the air compressor 33, the compressed air acting upon the top of the body of liquid in tank 20.

As the superheated liquid, containing terpenes, and the like, from the wood, is introduced into the container, to prevent excess pressure within the container and allow the liquid to flow freely into said container, valve 19ᵈ is opened and the vapors pass through pipe 19 into the sweat chamber, the charged vapors being employed as previously stated, to assist in sweating the wood. After the liquid is turned into the container, and the wood becomes submerged, valve 19ᵈ is closed, and steam is turned into the heating coils 15, to maintain the liquid at a temperature above its normal boiling point, which creates a pressure in the container— or, in other words, the liquid is maintained in a superheated condition.

It will be understood from the above that the vapors collect in the container in a space above the liquid, and it is to be emphasized that by providing this space above the liquid, a phenomena occurs which cannot well be explained, but which insures, as a matter of fact, a peculiar and most important practical result. That is to say, the superheated liquid contains volatile extractives of wood which act on the wood being treated to remove similar and other constituents. This superheated liquid acts to remove constituents which cannot, experience proves, be removed by superheated steam or water either with or without the space. With the superheated liquor of this invention, the ebullition thereof creates a constant irregular motion of the entire volume of liquid in the container, which with the admixed extractives, dissolves and removes constituents which rise into the space above the liquid. Theoretically, certain of these constituents remain suspended in the space, while others which are affected by the ebullition of the liquid, and possibly some action or reaction due to the gaseous vapors or the like in suspension, are caused to be returned and mixed with the liquor, with the effect to materially enrich the same. Whether or not this theory is correct, is problematical, yet it appears that this is at least a plausible solution, as actual demonstrations have shown conclusively that the substance after treatment is not discolored, though its physical characteristics have materially changed, which tends to prove that substantially all, if not all, of the vital and commercial constituents have been removed. Experience and use of the process has also demonstrated that in the final analysis, the use of superheated liquor employed very materially improves the grade of the final product and indeed produces certain constituents whose identity and character at the present time I am unable to determine. As stated, these results are attributed largely to the fact that the constituents and extractives removed from the substance are all retained in the liquor, and to the provision of a space above the liquor for the reception of the volatile constituents and the creation of an action thereon by the ebullition of the liquor. After an expenditure of a large amount of money and delay in experimentation with superheated water in a closed container with and without a space at the top, a low grade product only was produced, the substance being discolored and its condition demonstrated that complete removal of the necessary constituents was not effected. As a result of this, I finally evolved the present process, the important step of which was the employment of a superheated liquor charged with the constituents of the substance.

It is desirable to maintain the temperature of the liquid at or about 250° F., and maintain a corresponding pressure of about fifteen pounds above atmospheric.

The wood is subjected to the liquid treatment for a period of approximately one or two hours, depending entirely upon the nature and thickness of the wood and the quantity of materials which it is desired to extract from the wood. The superheated liquid including constituents of the wood dissolved in water being of high temperature and pressure, and containing the additional solvents taken from wood, quickly dissolves and extracts liquid soluble gums and similar soluble constituents, and also quickly extracts acids, oils and turpentines, and introduces the same to the liquid surrounding the wood and further melts and spreads the insoluble resins and acts upon the same. As these acids, oils and turpentines are extracted, they add to the solvent power of the liquid and extract materials in the wood, which would otherwise be substantially unaffected by the water alone.

The time of treatment under this step of the process, depends upon the nature of the by-products sought to be recovered, and for that reason the treatment may be shortened, so as to leave a portion of the resins in the wood, or it may be prolonged and intensified for such time and to such a degree as to substantially dissolve and extract the entire resinous content of the wood. To this extent, it is to be noted, that in so far as the degree of removal is concerned the process is not to be limited to time, temperature and pressure as these factors are also controlled by the character of by-product desired to be recovered; the salient feature, however, being the employment of superheated liquid containing terpenes or turpentines, acids, oils or other extractives of the wood.

The superheated liquid permeates throughout the entire structure of the wood, and the materials acted upon by it are dislodged from their original position in the wood, and those which are soluble in the liquid are dissolved and, due to the surrounding pressure and the agitation and ebullition of the liquid surrounding the wood, the materials which have been removed become intermingled or mixed in the entire body of the liquid. The liquid thus becomes charged with the by-products, the nature of which is largely dependent upon the character of wood being treated. It has been found, however, that in practicing the process, the liquid used in the treatment contains turpentines, pyroligneous acid, tar, pitch, resins, and the like, residue and pine oil, creosote oil and ligneous matter and the like. Furthermore, as long as the high heat is maintained, and the fact that the liquid is confined, the substances are so thoroughly intermixed in the liquid, as to make it impossible to independently distinguish them.

While the treatment is in progress, the liberated gases also become intermingled in the liquid. It has been found that these confined gases, charged with turpentines, acids, oils, etc., penetrate the wood and dissolve certain resinous properties, which are not of themselves soluble in water and thus materially assist in liberating other constituents of the wood, which are later separated and recovered as by-products. When the wood under treatment has been thus effectively acted upon by the superheated liquid mixed with contained extractives from the wood, the valves 18 and 19$^d$ are opened, and the vacuum pump started. This sudden release of pressure surrounding the wood, causes the liquid in the wood to expand and to become converted into steam, thereby forcing both soluble and insoluble materials in the interior of the wood towards its surface and into the liquid. This is a very important step in the process. This step and the preceding one may be resorted to as many times as deemed advisable, the alternate sudden actions acting to effectively withdraw the constituents from the wood and into the liquid.

The superheated liquid treatment having been completed the valves 18 and 19$^d$ are closed and valve 23 is opened and the liquid from the container is forced back into the tank 20, for reuse. The liquid is hastened from the container by opening valve 35, to introduce heated air under pressure supplied by the air compressor 33, upon the surface of the liquid. When the liquid has been removed from the container, the pressure in the container is suddenly lowered by opening the valve 18, and applying cold water through spray pipe 38 to condense the steam thus causing the liquid in the wood to expand and become converted into steam, thereby moving the melted resins from the interior of the wood surfacewise and removing the surface resins, this conversion of liquid in the wood into steam being due to the fact that previously the liquid in the wood has been raised to a temperature of approximately 250° F. and a corresponding pressure, and the sudden release of pressure to atmospheric reduces the boiling point of the liquid in the wood, also allowing a cellular or fibrous expansion of wood structure progressively from the exterior portions inwardly, which forces the resinous matter surfacewise. Following this step a pressure may be again applied within the container by the admission of steam, or heated air or a mixture of both such pressure acting on the wood to further expel any contained matters when the desired pressure is attained it is held for a limited time and is then rapidly reduced, valve 18 is opened, and the vacuum pump 9 is started, and a vacuum is again created in the container 13, and simultaneously cold water is sprayed on the wood through the spray pipes 38, to quickly reduce the pressure and condense the vapors. This step of alterations of pressure may be repeated as desired. In this step in the application of the vacuum, the spray of cold water is preferably employed only in the initiation of the vacuum, and the vacuum is held for one half hour approximately, depending on the character of the wood and the substances to be extracted. At the end of the step, the vacuum pump is stopped and the escaping moisture from the wood will in a few minutes destroy the vacuum, or if quicker action be desired, the valve 14$^a$ may be opened, to introduce steam to the container. The wood or material remaining in the container may now be removed, and a second charge being preliminarily treated in the sweat chamber, is now moved into the container.

In the next and succeeding operations in the container, the liquid is reused until it becomes concentrated to the desired degree, the charged water is drawn off and the various elements are distilled, or otherwise separated and recovered by mechanical separation, as by the centrifugal separator, or chemical reagents may be employed, or special solvents may be used.

The superheated liquid treatment may be repeated and alternated with a vacuum, to insure of the extraction of the elements from the wood, as it has been found that the wood structure when first opened up by the action of the water and then acted on by a vacuum, will give off further some of the constituent elements.

The superheated liquid step having been finished, and if it be desired to recover the resins and the like, a vacuum is again produced by starting the pump 9, to prepare the wood for the next step. The vacuum pump is stopped, and the valves 55 and 52 are opened and the superheated chemical solution in the tank 50 is violently introduced into the container 13, which breaks the vacuum in the latter, steam and heat in pipes 14 and 15 maintain the high temperature and pressure in the container, being maintained by steam in the pipes 14 and 15. The superheated chemical solution acts to dissolve and remove the ligneous and resinous substances from the wood to the water in solution, which are afterwards recovered by any well known process. After a short treatment of the wood with the chemical solution, valve 55 is closed, valves 52 and 35 are opened, and pressure from the pump 33 returns the solution from the container 13 to the tank 50, for further use.

Some of the solution and perhaps some of the ligneous and resinous substances still remain in the wood, and to recover both, I employ cold water to wash them out. Valves 52 and 35 are closed and valve 62 is opened and pressure from pipe 63 forces cold water from the reservoir 60 into container 13.

The difference between the high temperature of the wood and the low temperature of the water causes the moisture containing the solution and resins in the interior of the wood to be moved surfacewise and into the water, thus the solution and the remaining dissolved constituents including the ligneous matter are washed out, and may be afterwards recovered.

This step in the treatment is completed, and then the water is forced back into the reservoir for reuse.

The chemical solution and the cold water become mixed with the resinous substances from the wood, and therefore become agents to treat the constituents of the wood, and dissolve and remove the same for future recovery.

In the use of the term "superheated" as herein employed, I intend to define a liquid or liquor at a temperature above the normal boiling point of such, this temperature to the degree contemplated being permitted by maintaining the liquid or liquor at such pressure as will permit the use of the desired temperature without inducing a free boiling action of the liquid or liquor.

The process is in no way limited to use in connection with wood, as it is evident all plant substances may be acted upon to recover the various by-products.

From the foregoing description, it will be seen that I so treat the wood as to trap and recover the by-products from the wood when either extracted in the form of vapor, or when dissolved and dislodged in and by superheated liquid. Every element given off in the treatment is recovered and is, of course, separated and treated by any well-know process used for this purpose.

What I claim is:

1. The process of removing volatile and other extractives from a resinous solid plant substance, consisting in subjecting the substance to water at a temperature above its normal boiling point, with said water charged with all volatile extractives from a resinous wood resulting from a previous treatment of such wood with superheated water, the said water being further enriched and charged with volatile extractives removed or liberated from the substance during the progress of the treatment, to thereby remove constituent material from the substance being treated, removing the charged water, and thereafter separating the contained extractives from such charged water.

2. The process of removing volatile and other extractives from a resinous solid plant substance, consisting in first subjecting the plant substance to hot vapor charged with the volatile constituents from a resinous wood to heat the substance and preliminarily soften and impregnate the substance with the extractives contained in the vapor, then while the plant substance is still hot subjecting it to water at a temperature above its normal boiling point, with said water charged with all volatile extractives from a resinous wood resulting from a previous treatment of such wood with superheated water, the said water being further enriched and charged with volatile extractives removed or liberated from the substance during the progress of the treatment, to thereby remove constituent material from the substance being treated, removing the charged water, and thereafter separating the contained extractives from such charged water.

3. The process of removing volatile and other extractives from a resinous solid plant substance, consisting in subjecting the substance to water at a temperature above its normal boiling point, with said water charged with all volatile extractives from a resinous wood resulting from a previous treatment of such wood with superheated water, the said water being further enriched and charged with volatile extractives removed or liberated from the substance during the progress of the treatment, to thereby remove constituent material from the substance being treated, the treatment being carried out while the substance is free from contact with the air, removing the charged water, and thereafter separating the contained extractives from such charged water.

4. The process of extracting constituent materials of a resinous solid plant substance, consisting in submerging the plant substance in superheated water which has been previously employed in treating a resinous solid plant substance in a manner to incorporate in the water constitutent materials of such substance, trapping and condensing the vapors rising from the superheated water and subsequently introducing such condensate into the superheated water for enriching the same, withdrawing the charged superheated water with the contained constituent materials of the plant substance, subjecting the plant substance to a vacuum to further remove moisture and constituent materials in a more or less vaporous form, and condensing the vapor.

5. The process of extracting constituent materials of a resinous solid plant substance, consisting in subjecting the plant substance to moist hot air and vapor to recover the constituent materials, suddenly reducing the pressure on the surface of the material being treated to thereby cause a movement of the moisture and materials contained in said substance toward the surface thereof, then submerging the substance in superheated water to destroy the vacuum therein and dissolve and remove water-soluble constituents and melt a portion of the water-insoluble constituents and cause the same to intermingle with the superheated water, condensing the vapors rising from the water, then removing the water and reducing the pressure on the substance below atmospheric pressure to withdraw further vapors, and finally condensing the vapors to recover the contained portion of constituent materials.

6. The process of extracting constituent materials of a resinous solid plant substance, consisting in treating a load of the substance to hot moist atmosphere to sweat it, trapping the vapor and condensing same, utilizing all of the condensate for charging superheated water to dissolve and remove the water-soluble constituents of the substance and melt a portion of the water-insoluble constituents of the substance, collecting the vapors charged with the constituent materials resulting from the treatment and condensing such vapors, and thereafter drawing off the water containing the remaining constituent materials for future separation.

7. The process of extracting constituent materials of a resinous solid plant substance, consisting in subjecting the substance to moist hot atmosphere, suddenly reducing the surface pressure on the substance to cause the interior moisture to move toward the surface of the substance and carry with it constituent materials, collecting and condensing the vapors for separation of the constituent materials, subsequently submerging the plant substance in superheated water charged with the condensate, collecting the vapors rising from the superheated water and charged with the constituent materials for future separation of such materials, and thereafter withdrawing the water to permit the recovery of the contained constituent materials.

8. The process of extracting constituent materials of a resinous solid plant substance, consisting in collecting and removing the vapors from the substance while in a hot state, and then suddenly reducing the surface pressure on the substance by spraying the substance with cold water in a closed space to cause the contained constituent materials to move surfacewise while the surface of the substance is maintained at substantially atmospheric pressure.

9. The process of extracting constituent materials of a resinous solid plant substance, consisting in subjecting the substance to superheated vapors of steam and added extraneous terpenes and to radiant heat at a temperature sufficient to melt the resins in the substance, and subsequently subjecting the substance to the action of a vacuum and heat to remove a portion of the moisture charged with the constituent materials of the substance, and thereafter recovering such materials.

10. The process of extracting constituent materials of a resinous solid plant substance, consisting in raising the interior pressure of the substance above that of the atmosphere by contact with steam under pressure, then suddenly lowering the surface pressure of the substance by condensing the steam surrounding the substance by spraying with cold water.

11. The process of extracting constituent materials of a resinous solid plant substance, consisting in subjecting the substance to hot water charged with constituent materials of such substance in a liquid state at a pressure above atmospheric, then suddenly reducing the surface pressure of the substance to atmospheric pressure to cause the constituent materials and water within the substance to move surfacewise and from the substance into the surrounding water, and recovering the constituent materials.

12. The process of extracting constituent materials of a resinous solid plant substance, consisting in subjecting the substance to hot water charged with constituent materials of such substance in a liquid state at a pressure above that of the atmosphere, then suddenly reducing the surface pressure surrounding the substance to a pressure materially below that of the first mentioned pressure to cause the contained constituent materials and water within the substance to move toward the surface of the substance and into the surrounding water.

13. The process of extracting constituent materials of a resinous solid plant substance, consisting in submerging the substance in hot water previously charged with constituent materials of the substance in a liquid state to act on the water-soluble constituent materials of such substance, then expelling a portion of the water and contained constituents within the substance into the surrounding water by creating relative pressures around and within the substance; then removing the water while simultaneously applying air under pressure above the water sufficient to maintain the residual constituent materials within the substance under pressure, then suddenly reducing the air pressure to cause the residual constitutent materials within the substance to expand and travel to and beyond the surface of the substance.

In testimony whereof I affix my signature.

FREDERICK K. FISH, Jr.